(12) United States Patent
Andersson et al.

(10) Patent No.: US 6,811,527 B2
(45) Date of Patent: Nov. 2, 2004

(54) METHOD OF PRODUCING PRINTED PACKAGING LAMINATE, AND AN APPARATUS FOR CARRYING THE METHOD INTO EFFECT

(75) Inventors: Ingvar Andersson, Löddeköpinge (SE); Peter Öhman, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/432,247

(22) PCT Filed: Nov. 21, 2001

(86) PCT No.: PCT/SE01/02567
§ 371 (c)(1),
(2), (4) Date: Sep. 11, 2003

(87) PCT Pub. No.: WO02/42059
PCT Pub. Date: May 30, 2002

(65) Prior Publication Data
US 2004/0048726 A1 Mar. 11, 2004

(30) Foreign Application Priority Data
Nov. 24, 2000 (SE) .............................................. 0004317

(51) Int. Cl.[7] ................................................ B31B 1/88
(52) U.S. Cl. ....................... 493/187; 493/188; 493/320; 493/324

(58) Field of Search ................................... 493/187, 188, 493/320, 321, 322, 323, 324, 326, 328

(56) References Cited

U.S. PATENT DOCUMENTS

| | | | |
|---|---|---|---|
| 3,240,611 A | | 3/1966 | Williams |
| 4,119,452 A | | 10/1978 | Stolpe et al. |
| 4,793,251 A | * | 12/1988 | Kuhfuss .................. 101/93.01 |
| 4,901,993 A | * | 2/1990 | Hansch ...................... 270/21.1 |
| 5,365,720 A | * | 11/1994 | Bunch ......................... 53/411 |
| 5,460,844 A | * | 10/1995 | Gaylor ....................... 426/394 |
| 5,466,474 A | * | 11/1995 | Gaylor ....................... 426/394 |
| 6,209,291 B1 | | 4/2001 | Delén et al. |
| 6,562,171 B1 | * | 5/2003 | Archie et al. ............... 156/204 |
| 6,689,031 B2 | * | 2/2004 | Nanba et al. ................. 493/22 |

FOREIGN PATENT DOCUMENTS

SE 434 256 7/1984

* cited by examiner

Primary Examiner—Eugene Kim
(74) Attorney, Agent, or Firm—Burns, Doane, Swecker & Mathis, L.L.P.

(57) ABSTRACT

In the production of printed packaging laminate in web form, a method of reducing both waste quantity and stereo cost in connection with lamination, printing and splitting a material web, the material web being split into narrower semi-webs which are provided with a centred printed area and split into two webs of a final width by means of a similarly centred, longitudinal incision.

12 Claims, 1 Drawing Sheet

METHOD OF PRODUCING PRINTED PACKAGING LAMINATE, AND AN APPARATUS FOR CARRYING THE METHOD INTO EFFECT

FIELD OF THE INVENTION

The present invention relates to a method of producing a printed packaging laminate in web form, comprising the steps of coating a material web in full width with one or more layers of thermoplastic material, and splitting the web by means of longitudinal incisions. The present invention also relates to an apparatus for carrying the method into effect.

BACKGROUND OF THE INVENTION

In the conventional production of packaging material webs of the type which is employed for manufacturing single-use disposable packages for, for example, milk or juice, a laminated material is progressively created which comprises one or more carrier layers of relatively rigid material, e.g. fibre or foamed plastic material. On either side of the carrier layer, one or more layers of thermoplastic material, e.g. polyethylene, are progressively laminated in order, on the one hand, to impart strength to the laminate and, on the other hand, to ensure that the material obtains the requisite liquid- and gas-tightness. In those case when additional gas- and possibly light-tightness are desired, the laminate is provided with additional layers of barrier material, e.g. aluminium foil or different types of barrier plastics. The laminate is also provided with external decorative artwork by a printing process, and is normally moreover subjected to a mechanical processing with a view to producing a previously determined pattern of weakening lines, so-called crease lines, in order to facilitate folding and subsequent reforming of the laminate into individual packaging containers.

Traditionally, machine production of printed and creased packaging laminate encompasses a number of production stages between each one of which the packaging material web is rolled up in reel form and moved between different production equipment, e.g. for plastic coating, printing of material or splitting or dividing the material into several webs of the desired final width.

In a first production stage, the printing of the material web normally takes place, which is undertaken on a material web having slightly greater width than the total width of the final material webs. This is linked to the fact that printing of the material web cannot take place outside the longitudinal edges of the material web, and in order to make for a certain tolerance, the material web hence is of a width which exceeds by 5 to 50 cm the overall total width of the webs of final width into which the full-width web is subsequently to be split. After the printing, the material web is rolled up and transferred to a coating unit where the material web is unwound and caused to pass a number of extruders which provide the material web with the desired number of layers of thermoplastic material. In this unit, the web is possibly also provided with additional layers of, for example, aluminium foil or some other barrier material. The coating and possible application of, e.g. aluminium foil also takes place with a certain excess width, which implies that the material web, before once again being wound up, is subjected to an edge cutting which removes surplus plastic and possibly a surplus of, for example, the aluminium foil.

The material web which is thus wound up after the coating is once again unwound in a subsequent cutting unit in which the material web, by longitudinal incisions, is split into the desired number of webs of final width. Simultaneously with this splitting operation, an adjustment of the total width of the web also takes place in that the edge regions at both sides of the web are cut away. In such instance, int. al. the unprinted edge of the web is removed, as previously mentioned. After renewed winding up of the individual webs of final width, these are ready to be placed in a packing and filling machine or alternatively rewound and divided into individual sheets or packaging container blanks.

As will have been apparent from the foregoing, the production of laminated packaging material with current methods is quite complicated and includes, among other things, a number of winding up operations of the material web, several edge cutting operations including waste management, and several rewinding operations. Moreover, present methods result in a relatively large quantity of waste occurring, principally in the edge cutting operation, but also in the rewinding operations, since the outermost end sections of the material cannot be used. A major drawback is moreover that the printing of the material, as was mentioned above, must take place with printing rollers which are of greater width than is actually necessary. This entails that the stereos must have a larger surface area, which increases the stereo price since this is directly related to the surface area of the stereos. If one considers that, in the normal printing of high quality packaging material for, for example juice packages, printing is often done with eight colours, it will be readily understood that the cost for stereos is greatly increased because of the above-mentioned safety margins.

There is thus a general need in the packaging materials industry to realise a method for the production of printed, plastic-coated packaging laminate which takes it possible to greatly reduce the amount of waste in the production process and also reduce the area of the "unnecessary" stereo surface.

SUMMARY OF THE INVENTION

One object of the present invention is thus to realise a method of producing printed packaging laminate in web form, the method making it possible to reduce the need of edge cutting of the packaging material web and thereby reduce the quantity of waste material, as well as the costs for the waste material, and its management.

A further object of the present invention is to realise a method of producing printed packaging laminate in web form, the method making it possible to print the material with a stereo width which corresponds to the desired, final printing width.

Yet a further object of the present invention is to realise a method of producing printed packaging laminate in web form, the method simplifying the production process and reducing the number of rewindings of the material.

Still a further object of the present invention is finally to realise a method of producing printed packaging laminate in web form, the method considerably reducing the costs and simplifying the production of finished packaging laminate.

The above and other objects have been attained according to the present invention in that a method of the type described by way of introduction has been given the characterising feature that the material web is split into semi-webs each one of which being provided with a printed area centred in relation to a longitudinal centre line, and is split into two webs of a final width by incisions along this centre line.

Preferred embodiments of the method according to the present invention have further been given the characterising features described herein.

BRIEF DESCRIPTION OF THE DRAWINGS

One preferred embodiment of the method and the apparatus according to the present invention will now be described in greater detail hereinbelow, with particular reference to the accompanying, schematic Drawing which shows only those details essential to an understanding of the invention. In the accompanying Drawing.

DETAILED DESCRIPTION OF THE INVENTION

Figure 1:
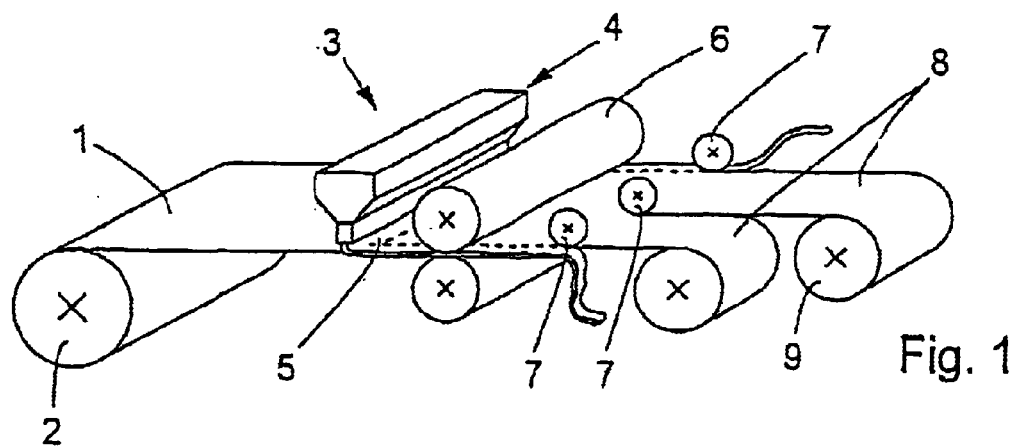
FIG. 1 shows in perspective a lamination process in accordance with the method according to the present invention.

FIG. 1 schematically shows how a material web 1 of full width is unwound from a magazine reel 2 and led into a so-called coater 3 in which the material web 1 of, for example paper, is coated with one or more layers of thermoplastic material, e.g. polyethylene, with the aid of one or more extruders 4. In the coater 3, the material web 1 may also be provided with one or more layers of barrier material, e.g. aluminium foil or the like (not shown in FIG. 1). Both the extrusion of the plastic film 5 and the possible coating with aluminium foil or barrier plastic take place with a certain surplus, i.e. both the extruded plastic and, for example, the aluminium foil project out somewhat beyond the longitudinal edges of the material web 1. This ensures that the total width of the material web 1, which corresponds to the total width of the individual, narrower webs into which the material web is subsequently to be split, will be completely coated and covered with both thermoplastic material and aluminium foil.

After the coating, the material web is led between cooling rollers 6 which, on the one hand compress the different layers and, on the other hand cool the thermoplastic so that this hardens and forms a liquid-tight surface coating on the material.

After completed lamination, the material web 1 is fed further past a number of cutter wheels 7 disposed in side-by-side relationship and which, on the one hand split the material into the desired number of semi-webs 8 of reduced width, and on the other hand cut off the surplus of plastic and possible aluminium foil or barrier foil which projects outside the original longitudinal edges of the material web 1. The thus formed, uniformly wide semi-webs 8 are thereafter wound up for the formation of a number of semi-reels 9 which are removed from the coater 3 and transferred to a subsequent printing unit 10 (FIG. 2).

The printing unit 10 is of conventional type and comprises a number of printing rollers 11 which are provided with stereos with the desired printing pattern for printing of each individual semi-web 8. Thus, a semi-reel 9 is placed at the infeed end of the printing unit 10 (to the right in FIG. 2) and is unwound so that the semi-web 8 passes between printing rollers 11 and counter rollers (not shown). Via the stereos of the printing rollers (not visible in FIG. 2) ink is transferred in the desired pattern to the upper surface of the semi-web, the passage past all printing rollers 11 ensuring that the web is printed with the desired number of colours for a print pattern of the desired character to occur. In the qualified printing of high quality packaging material for, for example juice or wine packages, use is often made of a relatively large number of printing rollers, since a complete print may encompass up to eight colours and thereby eight individual printing rollers provided with stereos. In connection with the printing, one or more rollers may also operate as creasing rollers, i.e. instead of printing on the material, they can, by mechanical compression thereof, provide the material web with the desired pattern of weakening or crease lines, in order to facilitate subsequent folding and reforming of the material web into individual packaging containers. Last in the printing unit 10, seen in the direction of advancement of the packaging material web from right to left in FIG. 2, there may be provided a printing roller which does not print the desired colour pattern but which instead is used to print a layer of protective lacquer covering the print pattern. This prevents the printing ink from being exposed to ambient air and mechanical contact, as well as ensuring that the printing ink does not come into contact with the food which is subsequently to be packed in packaging containers produced from the semi-web.

After the printing, the web is split with the aid of a cutter wheel 12 into two narrower webs 13 which have the final width which is desired for producing individual packaging containers or alternatively for producing blanks for packaging containers.

Figure 2:
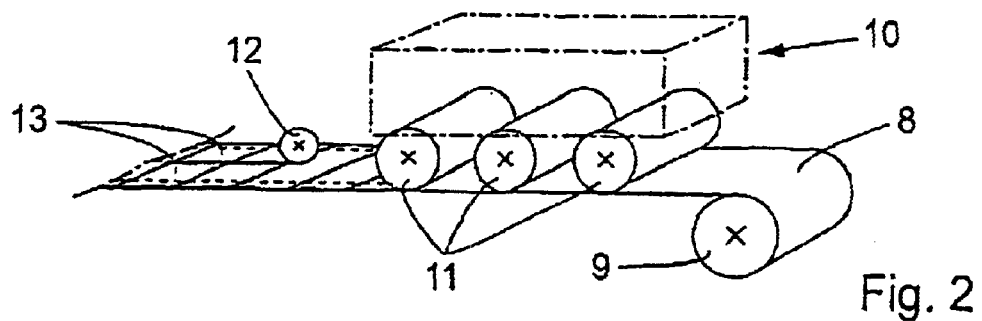
FIG. 2 shows in perspective a printing process in accordance with the method according to the present invention.
Figure 3:
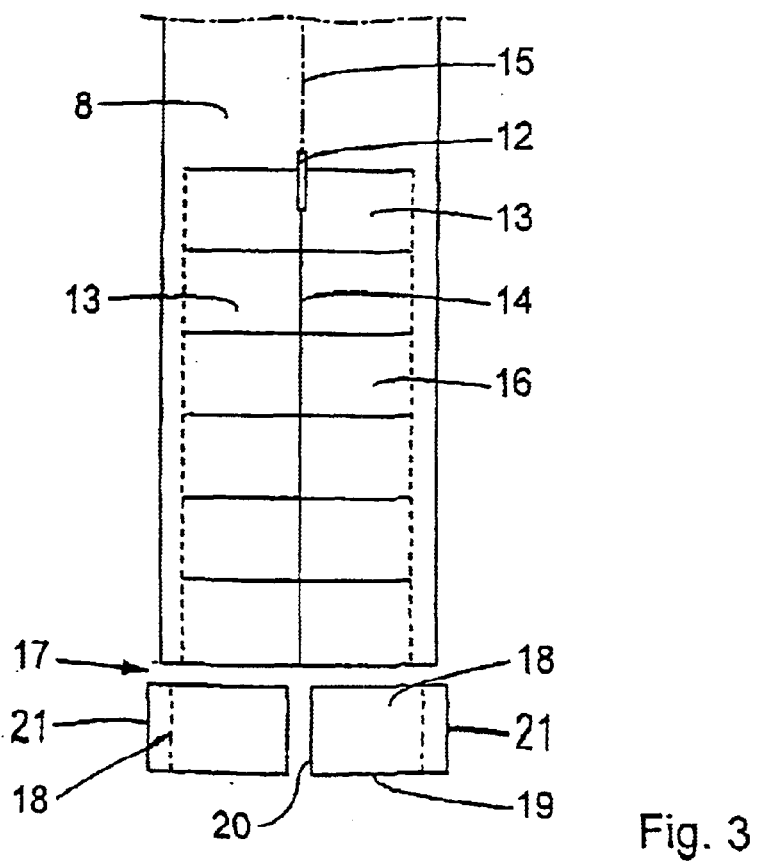
FIG. 3 is a top plan view of a part of semi-web according to the present invention.

FIG. 3 shows from above the appearance of a part of a semi-web 8 after having passed the printing unit 10 according to FIG. 2. In such instance, the semi-web is moved from above and downwards in the Figure, and it will be perceived how the cutter wheel 12, through the incision 14, splits the web into two equally large parts along the centre line 15 of the web. It will also be apparent how the print pattern 16 provided by the printing unit 10 is placed centrally in relation to the longitudinal centre line 15 of the semi-web 8, which implies that unprinted zones will occur along both of the edges of the semi-web facing away from one another. These zones will, after the conversion of the webs into packaging containers, form their bottom surfaces, which are normally unprinted. FIG. 3 also shows schematically a subsequent sheet division with the aid of repeated, transverse incisions 17 which divide the two parallel running webs 13 into individual sheets 18 with side edges 19, top edges 20 and bottom edges 21. It will also be apparent from the Figure how the print patterns for each individual package are located in sequence along the longitudinal direction of the semi-web, but with the opposite orientation on either side of the centre line. Because of the placing of the print pattern 16 centrally on the semi-web 8, this will be provided with print right out to the top edges 20, while the print pattern 16 terminates a slight distance from the bottom edge 21. Hereby, the printing may take place without running the risk of printing outside the total width of the semi-web 8, which makes it possible to print the material web without the need for longitudinal edge portions to be cut off after printing. As a result, the web 1 may be given an exact width from the outset, i.e. no longitudinal edge waste occurs during the total production process (apart from a surplus of plastic and possibly barrier layer). The central placing of the print pattern 16 also implies that the stereos of the printing rollers can be given a width which corresponds to the total width of the desired print pattern. As a result, on the one hand the need to make the stereos wider than is actually necessary is obviated, at the same time as one edge cutting operation is dispensed with, since, with this method, there is never the risk of printing outside the edge of the material. The absence of waste and the reduction of the printing area of the stereos imply considerable savings compared with current methods.

The apparatus for carrying the method according to the present invention into effect is shown and described schematically, but includes all of those design and construction features which are necessary for reducing the method into practice.

The method and the apparatus according to the present invention thus make it possible to produce multi-colour printed packaging laminate of high quality in a considerably simpler manner than has hitherto been possible. The method according to the present invention not only reduces handling and management of both packaging material and waste, but also simplifies the production process by reducing the number of rewindings of the material web. The reduction of the amount of waste, as well as the reduction of the necessary stereo areas entail major cost savings compared with prior art methods.

What is claimed is:

1. A method of producing printed packaging laminate in web form, comprising the steps of:
   coating a material web in full width with one or more layers of thermoplastic material;
   splitting the web by means of longitudinal incisions into semi-webs;
   printing the semi-webs such that each one of the semi-webs is provided with a printed area which is centered in relation to a longitudinal center line, wherein the printed area includes print patterns which are located in sequence along the longitudinal direction of the semi-web but with an opposed orientation on either side of the center line, the print patterns are oriented such that the parts of the print patterns that are to be most proximal a top edge of finished packaging containers are located adjacent the center line; and
   splitting each printed semi-web into two webs of a final width by incisions along said longitudinal center line.

2. The method as claimed in claim 1, wherein the material web is edge-cut to a width which corresponds to the desired number of webs of final width.

3. The method as claimed in claim 1, wherein the printed side of the semi-web after the printing is covered with layer protecting the printing ink.

4. The method as claimed in claim 3, wherein the protective layer is applied by a printing process.

5. The method as claimed in claim 1, wherein the semi-webs after spitting into the final width are divided into individual sheets by repeated, transverse incisions.

6. The method as claimed in claim 1, wherein the coating comprises:
   unwinding the material web from a reel; and
   passing the material web through a coater and one more extruders to coat the material web with the thermoplastic material such that the extruded thermoplastic material projects beyond longitudinal edges of the material web.

7. The method as claimed in claim 6, wherein splitting the web comprises:
   cutting the web by the longitudinal incisions into the semi-webs and cutting off surplus thermoplastic material that projects outside original longitudinal edges of the material web;
   winding up the semi-webs onto semi-reels; and
   removing the semi-reels from the coater and transferring the semi-reels to a printing unit which prints the semi-webs.

8. The method as claimed in claim 1, wherein the two webs have the same final width.

9. The method as claimed in claim 1, wherein the material web is additionally coated with one or more layers of barrier material such that the thermoplastic material and the barrier material project outwardly beyond the longitudinal edges of the material web.

10. The method as claimed in claim 9, wherein the barrier material is aluminum foil.

11. The method as claimed in claim 1, wherein each printed semi-web includes unprinted zones which are located along opposed edges of the semi-web facing away from one another.

12. The method as claimed in claim 11, further comprising converting the two webs into packaging containers such that the unprinted zones form bottom surfaces of the packaging containers.

* * * * *